United States Patent [19]
Rimkus

[11] Patent Number: 5,766,719
[45] Date of Patent: Jun. 16, 1998

[54] COMPOSITE MATERIAL

[75] Inventor: Ralph Rimkus, Brüssell, Belgium

[73] Assignee: Magna Exterior Systems GmbH, Obertshausen, Germany

[21] Appl. No.: 549,775

[22] PCT Filed: Mar. 10, 1995

[86] PCT No.: PCT/EP95/00896

§ 371 Date: Nov. 14, 1995

§ 102(e) Date: Nov. 14, 1995

[87] PCT Pub. No.: WO95/25005

PCT Pub. Date: Sep. 21, 1995

[30] Foreign Application Priority Data

Mar. 14, 1994 [EP] European Pat. Off. ............ 94103895

[51] Int. Cl.⁶ .................. B29D 31/00; B29C 44/14; B29C 44/18; B29C 44/32
[52] U.S. Cl. .............. 428/71; 428/132; 428/158; 428/159; 428/309.9; 428/310.5; 428/319.3
[58] Field of Search .................. 428/43, 71, 132, 428/158, 159, 304.4, 309.9, 310.5, 319.3; 264/46.1, 46.5, 46.6, 53

[56] References Cited

U.S. PATENT DOCUMENTS

| 4,105,481 | 8/1978 | Lofdahl | 156/79 |
|---|---|---|---|
| 4,136,223 | 1/1979 | Harder | 428/309.9 |
| 4,179,319 | 12/1979 | Lofdahl | 156/86 |
| 4,379,103 | 4/1983 | Doerfling | 428/309.9 |
| 5,344,208 | 9/1994 | Bien et al. | 296/187 |

FOREIGN PATENT DOCUMENTS

| 0 268 416 | 5/1988 | European Pat. Off. |
| 0 383 498 | 8/1990 | European Pat. Off. |
| 0 459 581 | 12/1991 | European Pat. Off. |
| 38 26 011 | 2/1990 | Germany |
| 40 39 135 | 6/1992 | Germany |
| 63-173611 | 11/1988 | Japan |
| 2 181 998 | 5/1987 | United Kingdom |

Primary Examiner—Marion E. McCamish
Assistant Examiner—Blaine R. Copenheaver
Attorney, Agent, or Firm—Spencer & Frank

[57] ABSTRACT

A composite material comprised of a support (1) and a heat foamable material (8), with the heat foamable material (8) being contained into a room (7) defined by the support (1) so that when heat is applied, form expands out of the room (7). Additionally provided is an expanded seal (9) obtained by using a composite material as defined here before and to a process for the manufacture of such composite material. Other applications of the composite material such as structure reinforcement and vibration dampening, are further discussed.

1 Claim, 12 Drawing Sheets

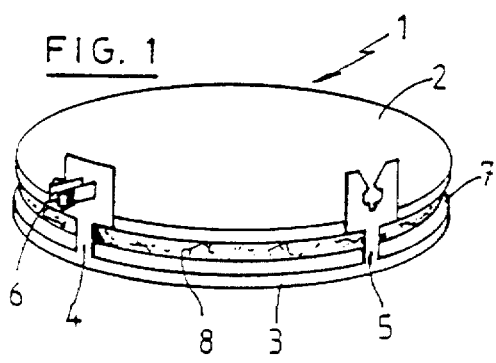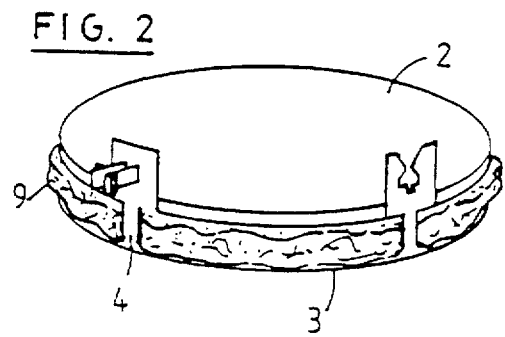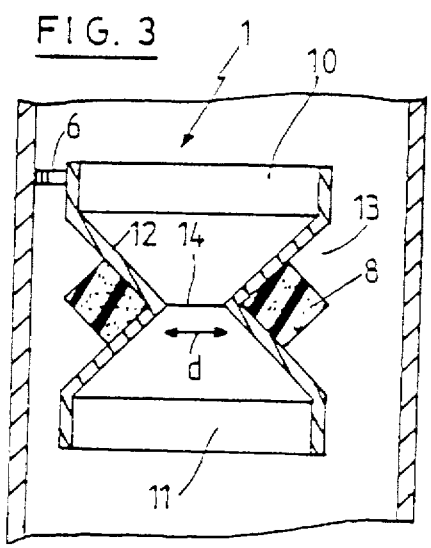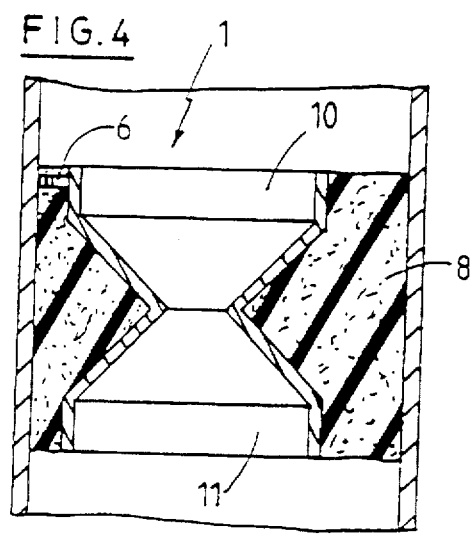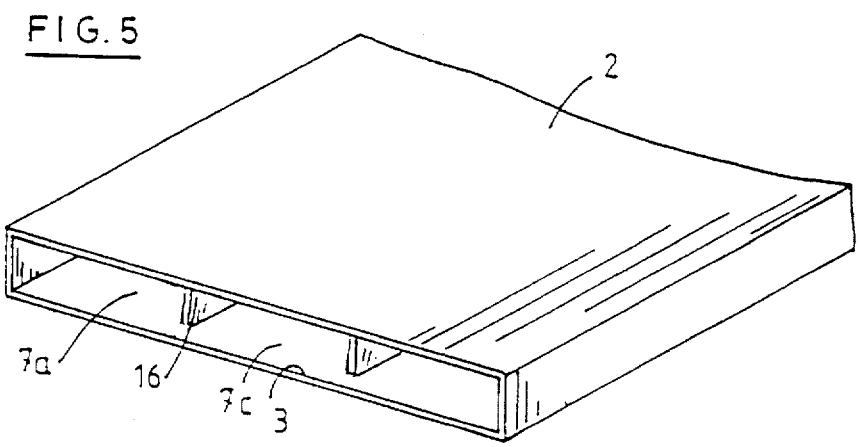

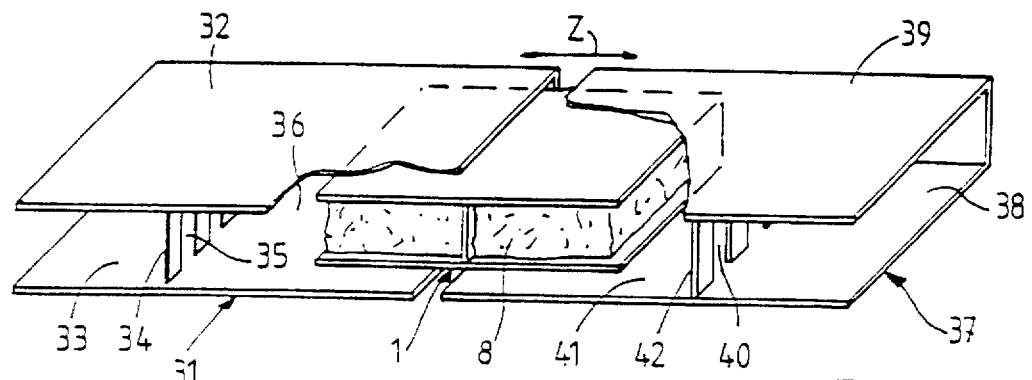
FIG.8
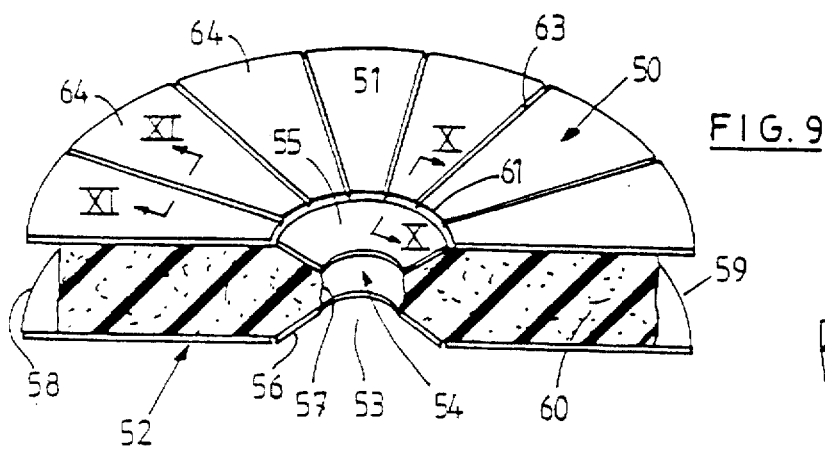
FIG.9
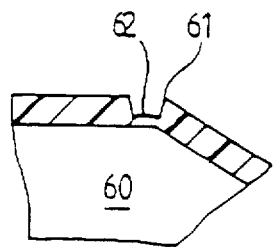
FIG.10
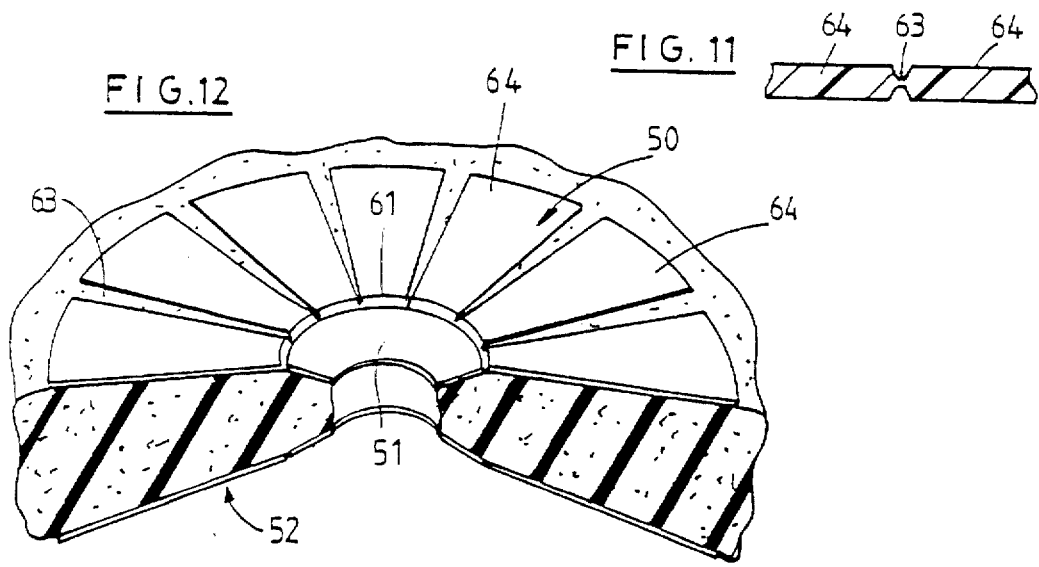
FIG.11
FIG.12

COMPOSITE MATERIAL

BACKGROUND OF THE INVENTION

The present invention relates to a composite material suitable for making seals, for example, in cavities of a car structure.

For making seals in cavities of vehicles, it is known to use heat foamable materials, i.e., materials which are converted at lease partly into a foam by heating.

For example, heat foamable materials are shaped, to be introduced in the cavity and are then submitted to a heating, to allow the foaming. Disadvantages of such a method are, for example,
- use of a major quantity of expansive heat foamable material;
- many geometries and positions are impossible because of flowing of the foamed material;
- assuming the amount of heat foamable material is unsufficient, no complete seal will be obtained;
- the structure will be submitted to unequal pressure due to the foaming.

SUMMARY OF THE INVENTION

The present invention has for subject matter a composite material using a limited amount of heat foamable material while being suitable for making an excellent seal. The pressure exerted by the foamable material can be used interactively by the support for either directing the flow of the foam or/and shaping or transforming the support. Other advantages of the composite material according to the invention will be given furtherbelow.

In the specification hereafter, the wording "room" is used for defining a space defined by a wall or several walls such as a channel, a groove, etc.

The composite material according to the invention is comprised of a support forming a room or space and of a heat foamable material arranged in the space or room, with the support being made of a material with melting temperature higher than the temperature required for the foaming, so that when heat is applied to the foaming material, the material expands to a foamed form out of the space through at least one opening, preferably several openings, of the support or opening(s) formed in the support due to the heat and/or the foaming pressure.

Advantageously, the room or groove formed in the support has at least one or several openings whereby at the foaming temperature, foam flows out of the room or groove in at least two different, preferably opposite direction. For example, when heat is applied, foam flows outside the room through two opposite openings, the flow of foam through a first opening being substantially in an opposite direction to the direction of the flow of foam through the second opening.

According to an embodiment, the support comprises an upper plate and a lower plate linked the one to the other by two walls forming channel(s) having a substantially equal cross-section between the parts of the walls arranged the one in front to the other. Such an embodiment is suitable to force the foam flowing out of the room to flow preferably in a direction corresponding substantially to the axis of the channel.

Possibly, part(s) of the support is free of heat foam expandable material, whereby during the foaming, foam glides first on the support before extending or flowing outside the support, so that during the foaming, the foam no more in contact with the support has a sufficient rigidity so as to expand substantially only in the plane defined by the support.

For example, the support comprises an upper plate and a lower plate linked the one to the other by walls forming channel(s) extending between opposite end-openings, one end of said channels being provided with a means to limit the passage of foam out of the channel(s) at said end(s). A preferred foaming direction is set, and the expansion force is controlled.

For facilitating the use of the composite material, the support is provided with a means for securing it on a frame or structure.

The support is, for example, made of a composition containing polyamide, i.e., of a material which is heat resistant at temperatures of 200°–255° C., a temperature, higher than the temperature required for the foaming.

According to a characteristic of an embodiment, the face of the upper plate directed towards the lower plate is parallel to the face of the lower plate directed towards the upper plate, said faces being separated the one from the other by a distance of at most 5 mm.

According to a further embodiment of a composite material according to the invention, the support comprises a first plate with a central hollow, or opening a second plate with a central hollow and an element linking the said plates to form a channel extending between said central hollows.

According to a further characteristic of an embodiment, the composite material has bending point(s) or line or lines with a low bending resistance, allowing the transformation of shape and/or the support is made of a material which is deformable at the foaming temperature when the foaming pressure is higher than a determined pressure.

For example, the composite material is comprised of a support element comprising a first part linked by bending point(s) or line(s) to a second part, with the first and second parts bearing each a plate, whereby the free end of the plate of the first part adjacent to the second part is distant from the free end of the plate of the second part adjacent to the first part, as well as from the second part.

A room is so defined between the first and second parts and their corresponding plates, with the room having at least one opening located between the free ends of the plates.

Foaming material is placed in the room. The foaming pressure is used to bend the first part with respect to the second part, (the bending point(s) or line(s) acting as a hinge) allowing the composite to change shape. Preferably the movement of the hinge is stopped by a stopper prolongation of the first or second part.

Heat foamable materials which can be used are for example, compositions disclosed in EP 90301406.6 (PCT/EP 91/01520). Such compositions contain for example, a polymer or copolymer of ethylene and unsaturated acrylic ester.

The invention relates also to an foamed seal which is susceptible to be obtained by the heating of a composite material according to the invention, the seal being characterized in that it comprises a support defining a space or room and a foam extending in the space or room, as well as partly outside the room towards wall(s) of the structure on which a seal has to be formed.

The composite material used is advantageously a material in which a major part of the foamable material is close to the wall(s) of the structure on which a seal has to be formed. In the seal obtained by using such a composite material a major part of foamed material is close to wall(s) of the structure.

According to an embodiment of the seal, the foam extending outside an opening of the space or room has a uniform density or the foam extending outside the room has a substantially uniform density.

According to another embodiment, the seal has a central opening defined by the support which is provided with a surrounding room or space, foamable material expanding outside the room so as to form a surrounding seal.

The invention relates also to a seal element, the element comprising:

- a first piece consisting of two plates separated the one from the other and linked the one to the other by a means advantageously provided with several openings, a room being defined between the two plates;
- a second piece consisting of two plates separated the one from the other and linked the one to the other by a means advantageously provided with several openings, a room being defined between the two plates, and
- a composite material according to the invention, composite material being partly located in the room of the first piece and partly located in the room of the second piece, so that when heat is applied, foam expands outside the composite material into the rooms of the first and second pieces reaching means linking the plates of the pieces so as to push the pieces away from each other.

The invention relates also to processes suitable for the manufacture of composite materials according to the invention.

According to a first process, the heat foamable material is injected in the room when the inner wall of the room has a minimum temperature of 50° C. The support is advantageously injected in a mold provided with a core, by example, an unmovable core so as to form a space in the support; the injected support being then removed from the mold and placed into a second mold, "hereafter the heat foamable material is injected into the formed room or space.

According to another process, a layer of heat foamable material is extruded between an upper film and a lower film, after, before or during the extrusion of said material between the films, links are formed between the films, and composite material consisting of an upper plate, a lower plate, at least a link and heat foamable material is cut in the films and layer.

According to a characteristic of the latter process, the heat foamable material does not attach on the films, whereby after the cutting of the composite material(s) and collecting the composite material(s), the films and the layer of heat foamable material are separately collected for their re-use or for the recycling thereof.

According to a further process, susceptible to be used for the manufacture of a support plate provided with a layer of heat foamable material having a thickness of less than 3 mm,

- a masking sheet is placed above the support to mask it partly,
- a powdered heat foamable material is applied on the unmasked part of the support, and
- before masking or powdering or after powdering, heat is applied to obtain a continuous heat foamable material layer or a continuous foamed layer on the support.

Other details and characteristics of the invention will appear from the description below which refers to the attached drawing.

BRIEF DESCRIPTION OF THE DRAWINGS

FIG. 1 is a perspective view of a first embodiment of a composite material according to the invention;

FIG. 2 is a perspective view of the first embodiment after foaming;

FIGS. 3 and 4 are cross-section views of a second embodiment of a composite material according to the invention before and after foaming;

FIG. 5 is a perspective view of a third embodiment of a composite material according to the invention;

FIG. 8 is a view of a sealing element using a composite material according to the invention;

FIGS. 9 and 12 are views of another embodiment of a composite material according to the invention before and after foaming; while FIGS. 10 and 11 are cross-sections of the embodiment shown in FIG. 9 along the lines X—X and XI—XI;

DETAILED DESCRIPTION OF THE PREFERRED EMBODIMENTS

Figure 6:
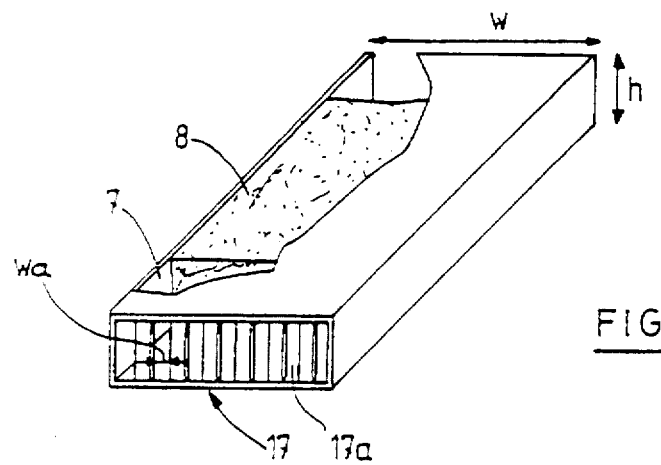
FIG. 6 is a perspective view with cross-section of a fourth embodiment of a composite material according to the invention.

FIG. 1 shows a composite material comprising a support 1 consisting of two parallel plates 2,3 which are locked together by means of walls 4,5, the latter being provided with means 6 for securing it onto a structure, for example, into a cavity thereof.

A room 7 is defined between the upper plate 2 and the lower plate 3, a room which is provided with a substantially continuous surrounding opening. In the room 7, a heat foamable material 8 is injected.

The plates are made of a material having a melting temperature higher than the temperature required for the foaming of material 8. For example, the plates are made of polyamide 6-6 resisting to temperature higher than 200° C., while the heat foamable material is a material as disclosed, for example, in EP 90301406.6, a material which is environmentally friendly (no emission of isocyanate or CFC being produced during the processing).

When heating the composite material at a temperature of 140°-200° C., the heat foamable material 8 starts to form a surrounding foam seal 9 which is intended to contact the wall of the cavity, to form a complete seal. Such a seal is adequate for reinforcing a structure, for adhering on the wall of the cavity, and for having a sound deadening effect.

The plates 2,3 act as guiding means for the foam, i.e., the foam escaping the room 7 is directed towards a wall of the cavity and its expansion occurs substantially only between the planes in which the plates 2,3 extend. The foam exerts substantially a same pressure all around the wall of the cavity, while the density of the foam located outside the room 7 is substantially constant, as due to the plates, the foam escaping the space 7 is substantially unable to flow (sufficient rigidity) or is provided with an outer layer substantially unable to flow or sufficient rigid.

FIG. 3 shows another embodiment of a composite material comprising heat foamable material according to the invention, composite material arranged for making a surrounding seal 9, as well as a central opening to permit the passage of cable(s), the passage of a drain tube, the passage of liquid, gases (water, water-vapor) while ensuring at the same time a sound deadening effect.

The support 1 has an annular shape consisting of an upper wall 10 (for example ring shaped), a lower wall 11 (for example ring shaped) and an intermediate element 12 defining between said wall an annular space or room, in the form of an annular groove 13. The support 1 is provided with a central opening 14. The intermediate element 12 consists of two funnel-shaped (truncated frusto-conical shaped) walls attached the one to the other at their ends having a smaller diameter d than the diameter of the upper and lower ends of the attached funnels. The upper shaped wall 10 is provided with a means 6 for attaching the support 1 into a cavity 15, for example, a pipe.

An annular heat foamable material 8 is placed in the groove 13. When heating at 140°–200° C., the foamable material 8 expands outside the groove or space 13 to a foamed form, the expansion being controlled by the wall of the groove, as well as by the inner wall of the cavity. Due to the surrounding opening, the foam expanding outside the room is distributed in such a way that the foam exerts a substantially equal maximum pressure all around the seal in contact with the walls of the cavity.

Foam expands also preferably between the walls 10 and 11 and the inner wall of the cavity to form a further seal ensuring, for example, that no water can stay between a wall and the inner wall of the cavity.

FIG. 5 shows a further embodiment of a composite material according to the invention. In this embodiment, the composite material consists of an upper plate 2, a lower plate 3 parallel to the upper plate 2 and linking plates or walls 16 defining a plurality of first rooms 7a separate the one from the other and connected at their ends respectively to a second common room 7d and 7c. Each space 7 defined between an upper plate, a lower plate and two linking plates has two opposite end openings and forms a guiding channel having a substantially constant cross-section.

A heat foamable material is placed within the first room 7a, so that during the foaming, foam flows outside the room in two opposite directions A, B and remains substantially in the space located between the planes of the upper plate, the lower plate and the linking plates.

FIG. 6 is a view of a composite material similar to that shown in FIG. 5, except that an end opening of a space or room or channel 7 is provided with a means 17 for limiting the flow of foam outside the room or channel through the end opening for acting against the flow of foam outside the room or channel through the end opening. Such a means is, for example, a comb or other similar piece defining a plurality of small openings 17a, preferably openings which are parallel the one to the other and which have a reduced width wa with respect to the width w or height h of the room or channel 7.

The heat foamable material 8 is located within the room 7 and does not fill completely the room 7 in its unfoamed form.

Figure 7A:
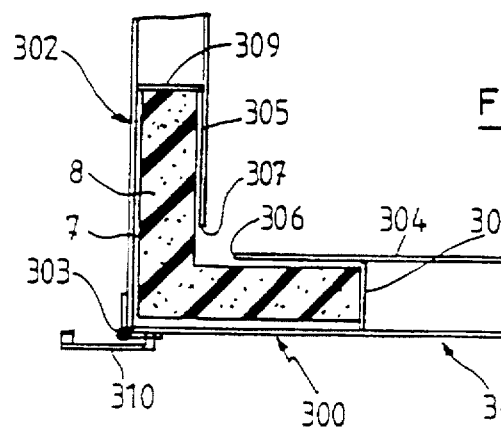
FIGS. 7A to 7C are views of yet another embodiment of a composite material according to the invention.

FIG. 7a shows another embodiment of a composite material according to the invention. The composite material is comprised of a support element 300 comprising two parts 301,302 linked together by a bending line 303. Each part bears, independently from the other, a plate 304, 305, the free end 306 of the plate 304 of the part 301 being distant from and not linked to the free end 307 of the plate 305 of the part 302.

A room 7 is so defined by the parts 301,302 and their plates 304,305.

The plates 304,305 are attached to parts 301,302 respectively by linking walls 308,309.

The bending line 303 consists of a groove whereby the thickness e of the support material is reduced.

Heat foamable material 8 is placed in the room 7 and acts as means ensuring that no bending occurs when the composite material is used at a temperature lower than the foaming temperature, i.e., at a temperature at which the heat foamable material is rigid, for example when the composite material is placed into a cavity.

Figure 7B:
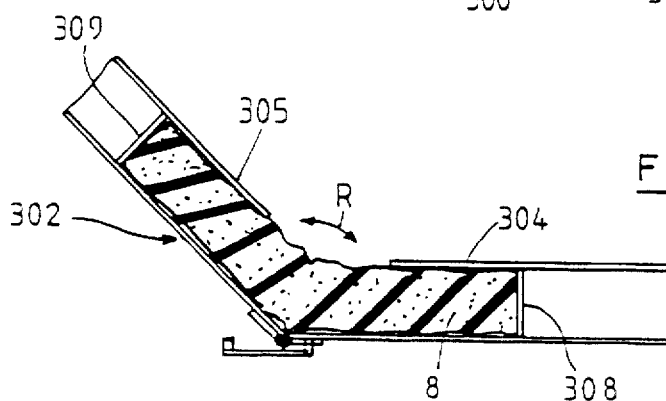

When the foaming temperature is reached, due to the pressure of the foam exerted on the support element, linking walls 308,309 and on the plates 304,305, the part 302 rotates (R) around the bending line 303 with respect to the part 301 (See FIG. 7b).

Figure 7C:
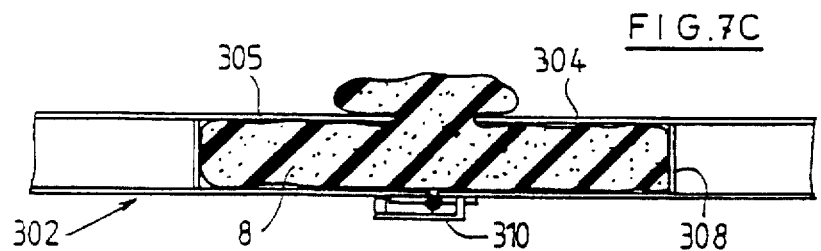

Due to a stopper prolongation 310 borne by the part 302, the part 302 is able to rotate up to contact said prolongation 310. Foam partly flows outside the room 7 through the opening defined between the free edges of the plates and acts therefore as means for connecting rigidly the parts 301,302 together and as means for ensuring that the part 302 is no more able to pivot with respect to the part 301 (See FIG. 7C).

FIG. 8 shows a sealing element using a composite material according to the invention. The element 30 comprises:
a first piece 31, consisting of two plates 32,33 separated the one from the other and linked by a means, such as wall 34, provided with several openings 35, a space or room 36 being defined between said two plates,
a second piece 37 consisting of two plates 38,39 separated the one from the other and linked by a means 42 provided with several openings 40, a room or space 41 being defined between said two plates, and
a composite material 1 according to the invention.

The composite material is partly located in the room 36 of the first piece 31 and partly located in the inner space or room 41 of the second piece 37, so that when heat is applied, foam expands outside the composite material into the spaces or rooms 36,41 of the first and second pieces reaching the means 34,42 linking the plates of said pieces so as to push the pieces away the one from the other (arrow Z). When the foam pressure gets higher, foam can partly flow through the openings 40,35.

FIG. 9 shows a further embodiment of a composite material according to the invention.

In this embodiment, the support 1 consists 25 of:
a first plate 50 provided with a circular opening 51;
a second plate 52 provided with a circular opening 53, and
an element 54 linking the plates 50,52 and so as to form a channel extending between the openings 51 and 53. Element 54 comprises two hollow funnel shaped pieces 55,56; the ends of which having the lower cross-section or diameter being linked together for example by means of a tube 57.

Between the plates 50,52 and the element 54, an annular space or groove 58—is formed, the space or groove having a surrounding opening 59 and being partly or entirely filled with a heat foamable material 60.

The upper and lower plates 50,52 are linked to the element 54 in such a way that parts of the plates are able to pivot along an edge 61 during the foaming. For example, the edge 61 is provided with a cutting 62 on its face opposite to its face directed towards the space 58 (see FIG. 10).

The upper and lower plates 50,52 are comprised of a plurality of arc-sections 64 linked together by a breaking line 63 (see FIG. 11). When the foam pressure against the plates 50,52 is high enough, the arc sections will fold at the weakening lines and take the shape of a funnel.

FIGS. 13 to 16 are schematic step views of a process for the manufacture of a composite material according to the invention.

A mold 60 is provided with two molding chambers 61,62, and a central core 63 extending in the molding chamber 61. A cover 64 has two protrusions 65,66 intended to be introduced partly into the molding chambers 61,62 so that at least during the injection of plastics or other materials into the molding chamber 61, a protrusion 65 contacts the central core 63.

The cover 64 is provided with channels 66,67 respectively for injecting materials for making the support and heat foamable materials.

The various steps of the process will be explained herebelow:

Step A

The molding chambers 61 and 62 are void. After closing the chambers by means of the cover 64, plastic material is injected in a molding chamber 61 so as to form a support provided with a space or room or groove.

Step B

The cover 64 is removed so as to draw the injected support 1 out of the chamber 61 and the cover 64 is rotated (arrow R) so as to place the injected support in front of the molding chamber 62.

Step C

Figure 16:
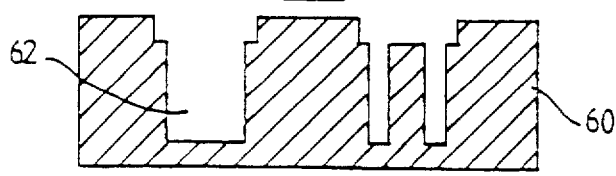

The cover 64 is closed to push the injected support in the molding chamber 62 and to close the two molding chambers (see FIG. 16).

Step D

Figure 13:
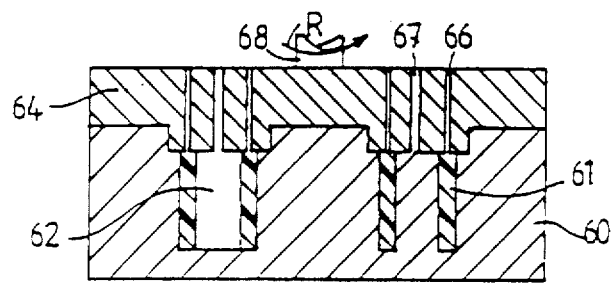
FIGS. 13 to 16 show steps of a process for the manufacture of a composite material according to the invention.
Figure 14:
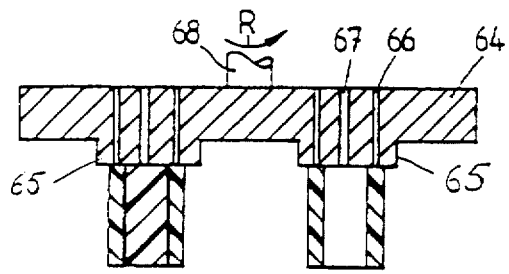
Figure 15:
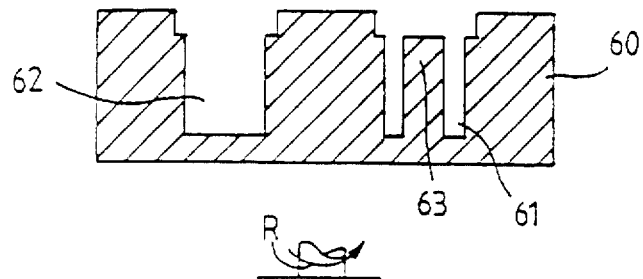

In the molding chamber 61, plastic such as polyamide is injected, while in the molding chamber 62 heat foamable material is injected. The polyamide is injected at a temperature of about 270° C., while the heat foamable material is injected into the inner space or room of the previously injected support at a temperature of about 75°–105° C. As the time necessary for taking an injected support out from the molding chamber 61 and for pushing it into the molding chamber 62 is very short, it is possible to ensure the injection of heat foamable material, while the support has still a temperature of about 100° C. (i.e. higher than 50° C.), whereby it is possible to obtain a better injection, i.e., an injected heat foamable material with a higher density or a higher expansion coefficient (See (FIG. 13).

Step E

The cover 64 is removed. To the cover, a composite material and a support are attached. The cover 64 is rotated (arrow R) (see FIG. 14).

Step F

After a rotation of 90° around its shaft 68, the formed composite material is ejected. (see FIG. 15).

Step G

The cover 64 is then rotated around its shaft so as to place the remaining injected support 1 in front of molding chamber 62.

The process can then be continued by repeating steps C to G.

The composite material manufactured by such a process may have a heat foamable material with a maximum thickness of about 5 mm or even lower, for example, lower to 3 mm.

Figure 17:
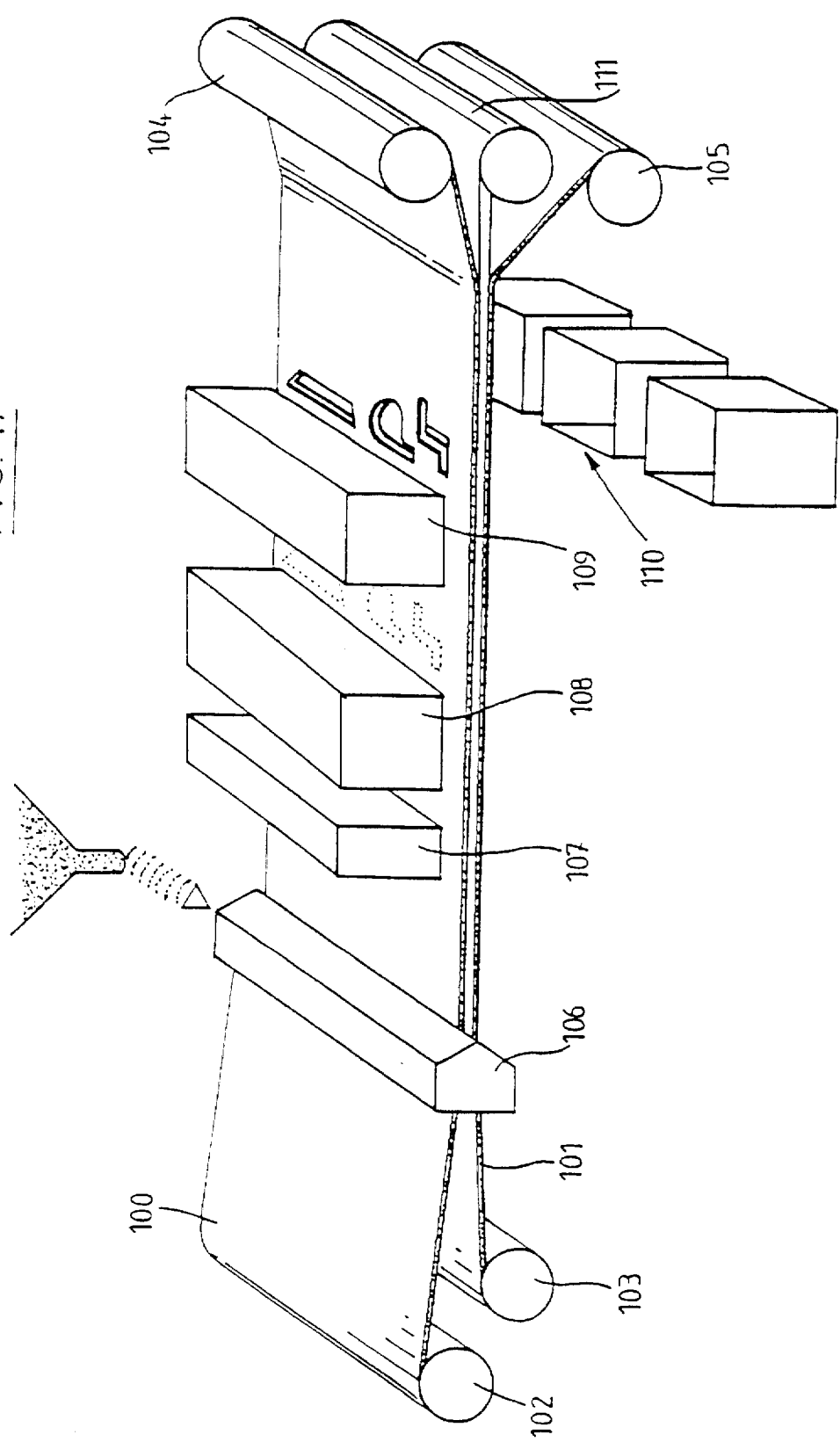
FIG. 17 is a view of another process; and 7

FIG. 17 shows schematically a further process for the manufacture of composite material according to the invention. According to this process, two films 100,101 of polyamide pass through several treatment stations, with these films coming from roll films 102,103 and being collected after treatment in the form of roll films 104,105.

The machine used for the process comprises:

an extruder 106 intended to extrude a heat foamable material between the two films 100,101;

a unit 107 for marking the places where the films will have to be cut, and printing part number as well as producer codes, etc;

glued on the plate. A plate 200 provided with a thin layer 204 of heat foamable material is obtained.

Figure 19:
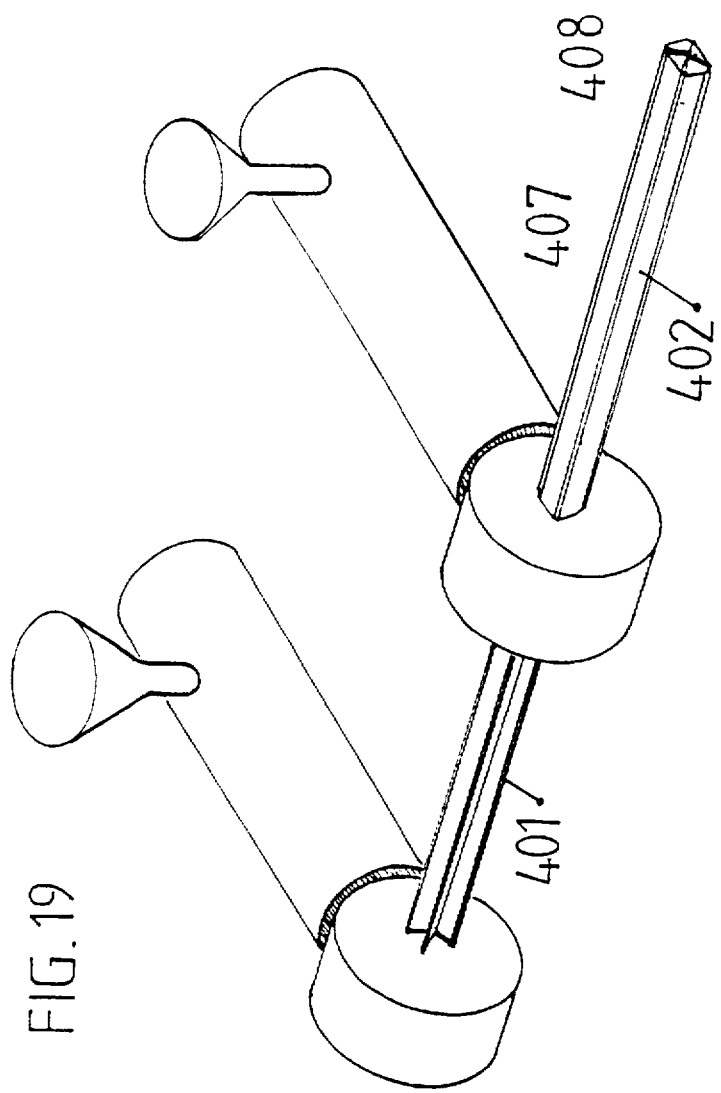
Figure 20:
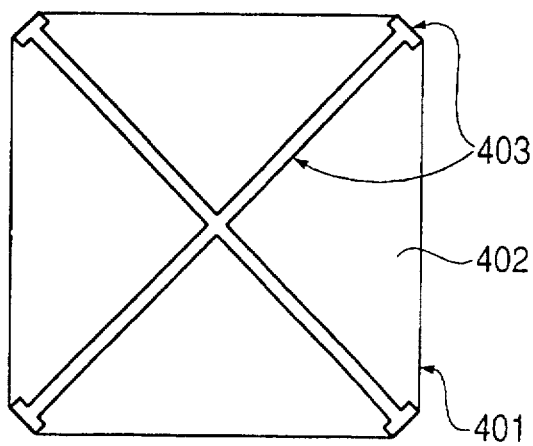

FIG. 19 shows schematically yet another process of manufacture of the composite material in which the support (401) is extruded in a form of a continuous profile (401) which is filled or/and brought together, in a separate process (407) or within the same continuous process, with the heat-foamable material profile or is comprised in a room or grove (403) or several rooms or groves (403) formed by the supporting material profile, as shown in FIG. 20.

Figure 21:
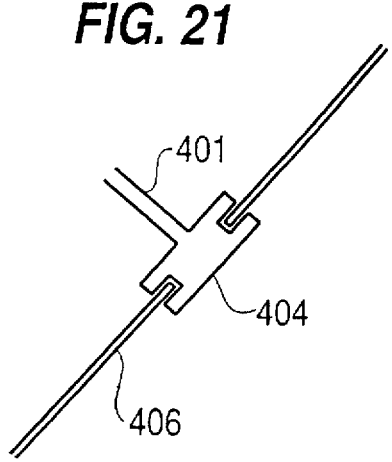
Figure 22A:
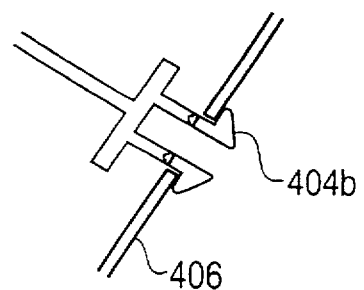
Figure 22B:
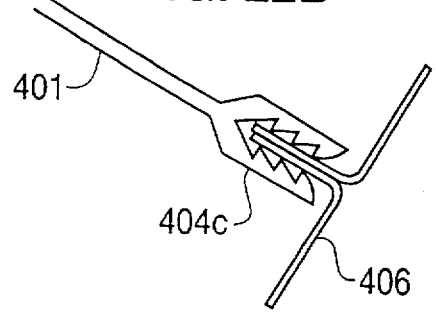

The extruded composite material profile may have extensions (404) (404b) or groves (404c) which can be used as attachment to the body of the cavity to be sealed, or the body to be adhered to (406), see FIGS. 21–22.

Figure 23:
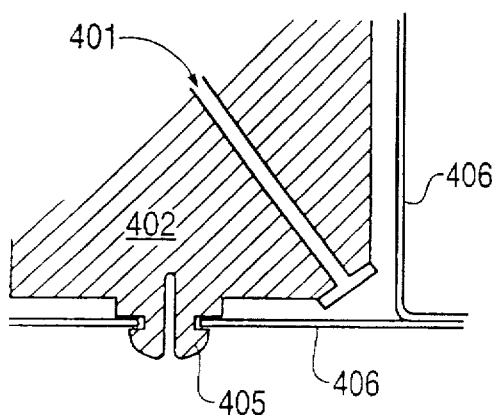
Figure 24:
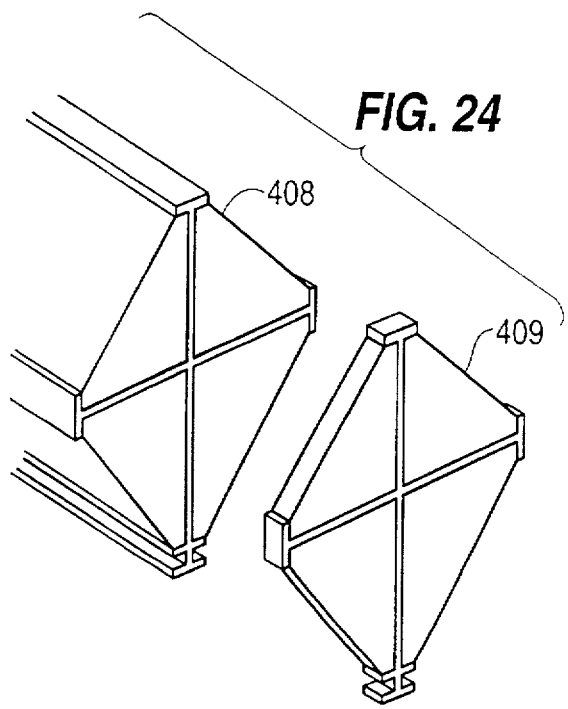

Such extensions can also be formed in the heat-foamable material (405) in such a way, that the attachment of the composite material towards the body (406) is entirely sealed, see FIG. 23.

The heat foamable material may be arranged in such a way, that the attachment (404) towards the body to be adhered to, if it is made of the carrier (support) material, will be completely surrounded by foam, after the heat-foamable material has expanded, in such a way that eventual perforations in the body, serving for the fixation of said composite material, will be completely sealed.

a unit 108 introducing linking means between the two films;

a unit 109 for cutting the films at said marked places, and a unit 110 for collecting the composite materials obtained by said cutting.

As advantageously, the heat foamable material does not adhere too highly on the polyamide films, the layer of the heat foamable material is collected after the cutting unit on a roller 111.

The polyamide which is not used as well as the heat foamable material which is not used can then be re-used, respectively, for making continuous films and for being extruded.

Figure 18:
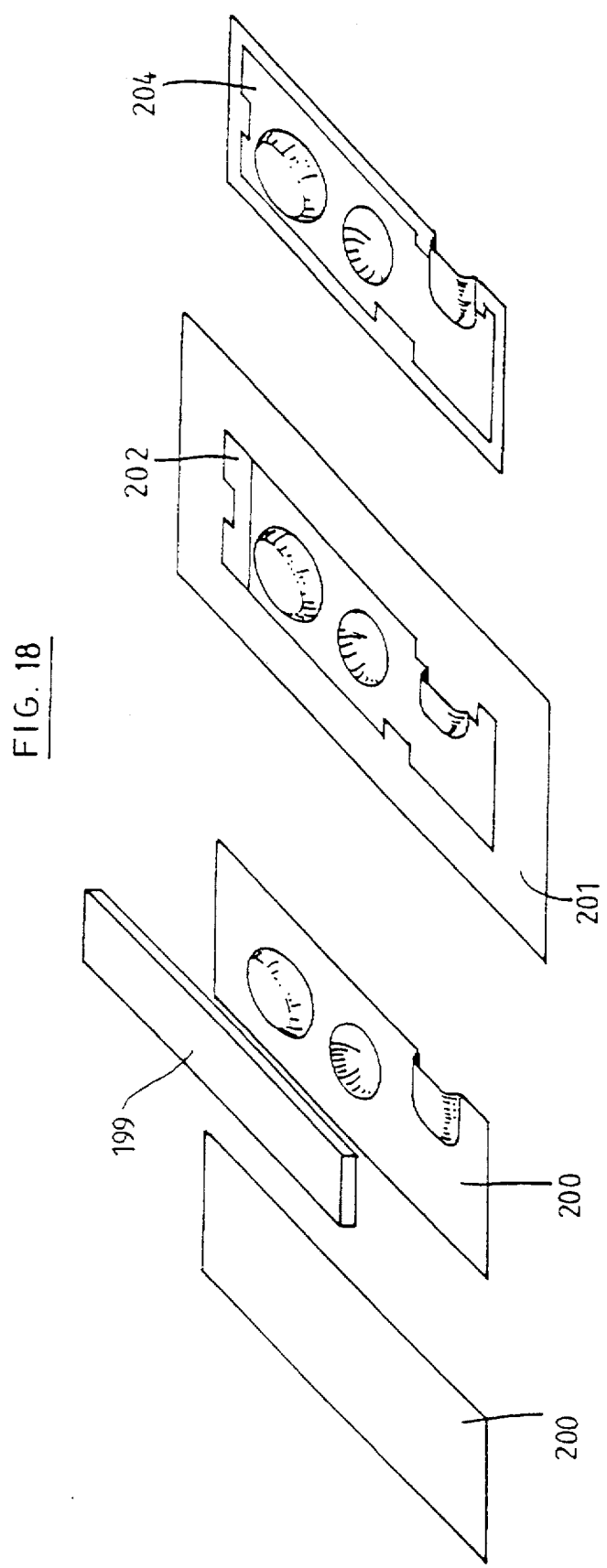
FIG. 18 is a view of yet another process.

FIG. 18 is a further schematic view of a process for the manufacture of a support provided with a thin layer of heat foamable material or a thin foamed layer.

In the process, a shaped plate 200 is heated by heating at a temperature lower than the foaming temperature (heating element 199). A masking sheet 201 with an opening 202 is placed on the support plate 200 so that heat foamable material can only be powdered on the unmasked part of the plate 200. Due to the temperature of the shaped plate, the powdered heat foamable material contacting the heated shaped plate is The herewith obtained continuous composite material (408) profile is then cut into slices (409) or blocks or lone stripes, or stored in a continuous form, for example, rolled, depending on the further application.

Figure 25A:
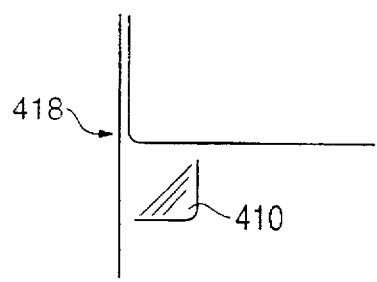
Figure 25B:
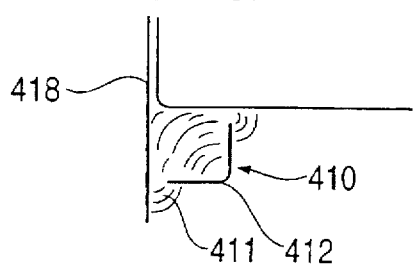
Figure 26A:
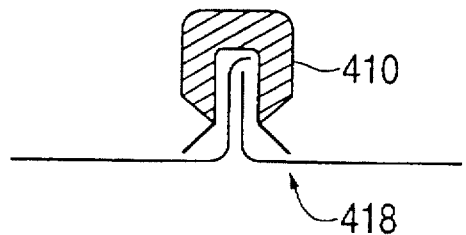
Figure 26B:
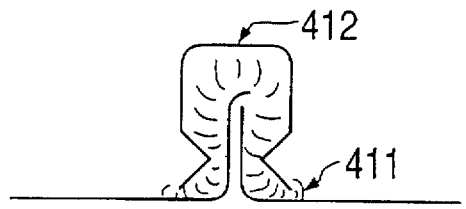

The fields of application are large. The continuous composite material profile (410) can be used in its continuous form to join two or several welded metal sheets 418 together along the welding line, either on the one side (FIG. 25) or on the other side (FIG. 26), the foam having a sealant-function (411)and the carrier strip (412) having the function of keeping the foam in its place or/and serving as an impact protection (FIG. 26).

Figure 27:
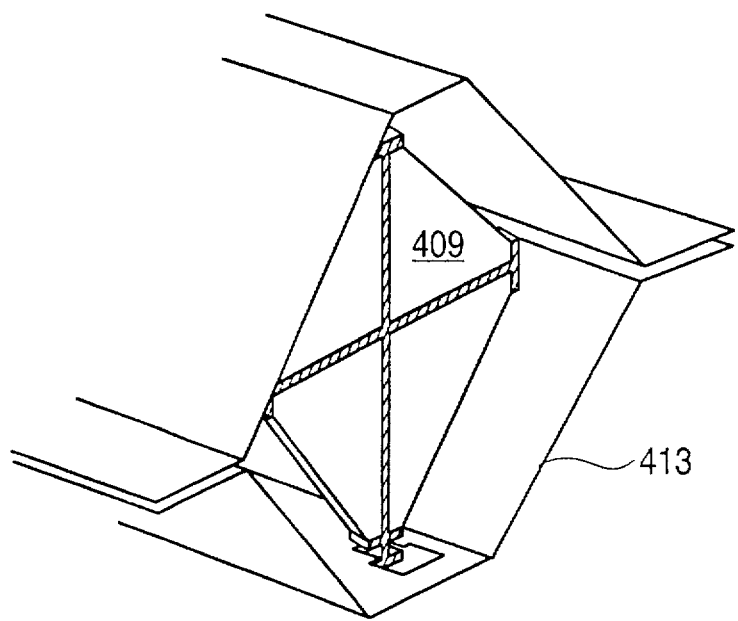
Figure 32:
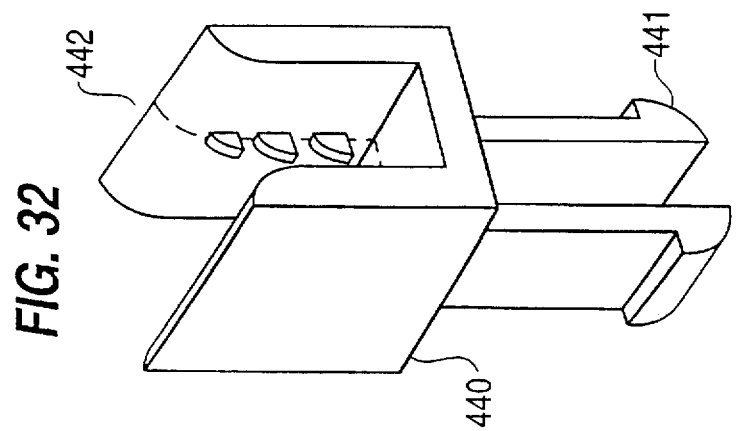
Figure 31:
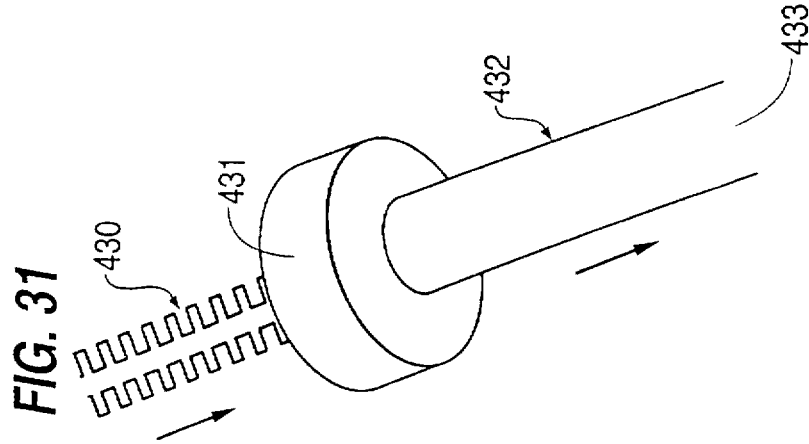

The continuous composite material profile may be used in the form of slices cut from the profile (408). The slices can then be fitted to the body to be adhered to (413, FIG. 27), with the same means of fixation as described earlier and shown in (FIGS. 21 and 22, or with an additional fixation clip (440), see FIG. 32, the fixation clip being composed of one part clipping to the body to be adhered or attached to (441), and one part (442) destined to hold the composite material slice.

Figure 28A:
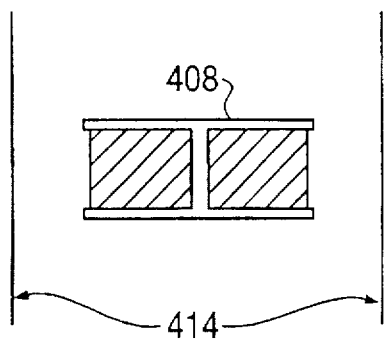
Figure 29:
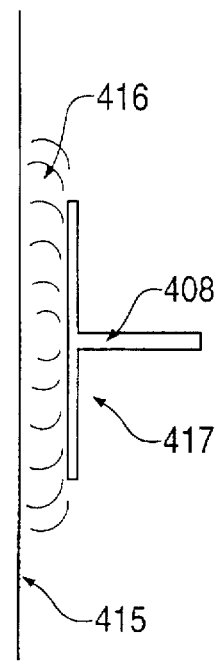
Figure 28B:
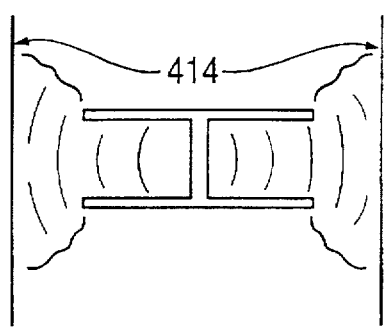

According to another embodiment, the composite material profile (408) can be used to join parts of a structure (414), for instance, several body panels (414), thereby reenforcing the structure; see FIG. 28.

As described above, it is possible to cut the parts to their final form either on line, or off line on a separate cutting station.

It is also possible to create such parts in a mixed technique which consists in extruding the carrier profile (401) as a continuous profile, see FIG. 19, and to cut the profile on line or off line to final length and to use the hereby obtained parts as inserts in a second process in an injection mold. The extruded carrier profile is then surrounded or filled or brought together with the heat expandable material inside the injection mold during the injection molding process.

It has been proved that the carrier part of the composite material guides and holds the heat expandable material. This quality can be exploited before foaming, during the foaming as well as after foaming is completed.

The carrier part in the composite material may take the shapes as described above but it can also be arranged in such a way that the heat expandable material extends outside the rooms or groves. It may even extend so far out of said rooms or groves or spaces that the carrier part in the composite material may be partly or entirely covered by the heat expandable material.

Figure 30:
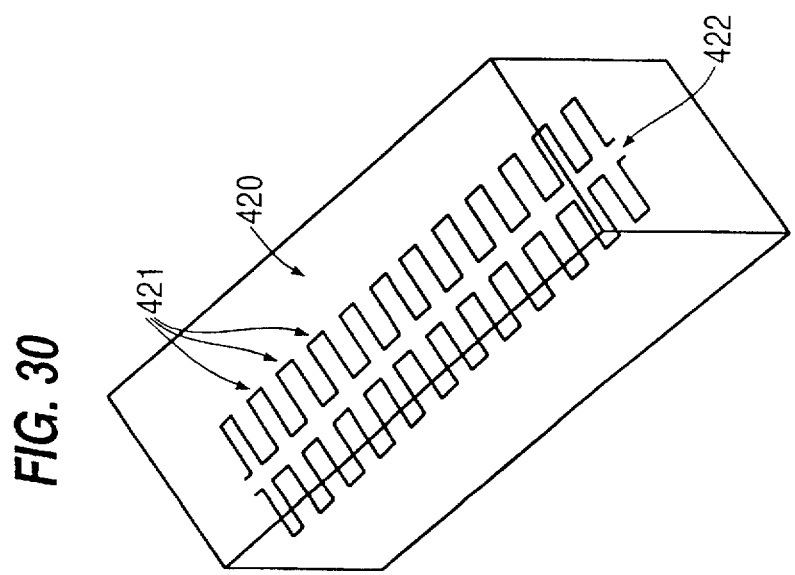

According to another embodiment, the carrier part may take shapes characterized in a central core 422 and extensions 421 such as stripes or sticks, surrounded partly of entirely by heat expandable material (420), see FIG. 30.

Such a part can be obtained either by extrusion or injection molding or in a mixed technique.

In case of an extrusion process, a preshaped profile of carrier material 430 is pulled through the extrusion die 431 and filled or surrounded or brought together with the heat expandable material 432. The composite material profile 433 obtained in this way is the n cut to shape.

In the case of an injection molding, the carrier part (421+422) which has been produced earlier in a separate process is then inserted in an injection mold, in which it will be filled or surrounded or brought together with heat expandable material (420). Should a fixation means not be shaped in the core of the composite material, it can be added in the form of a clip or fixation (440) comprising a part (442) which holds to the composite material and a part (441) which holds to the body to be adhered to, see FIG. 32.

I claim:

1. Sealable element comprising: a first piece, consisting of two plates separated from each other and linked by a means provided with several openings to define a room or groove between said two plates; a second piece consisting of two plates separated from each other and linked by a means provided with several openings to define a room or groove between said two plates; and a composite material partly located in the room or groove of the first piece and partly located in the room of the second piece, with the composite material comprising a support including a first plate and a second plate disposed parallel to and spaced from one another, and means for connecting the plates together to form a room or groove between the two plates of the support, and a heat foamable material arranged in said room or groove of the support, and with said support being made of a heat resistant material with a melting temperature higher than the temperature required for the foaming of the foamable material, so that said foamable material, when heat is applied thereto, expands to a foamed form extending out of the room or groove of the support through at least one opening of the support or formed in the support due to foaming pressure and into the rooms or groove of the first and second pieces reaching the means linking the plates of said pieces so as to push the pieces away from each other.

* * * * *